(No Model.) 3 Sheets—Sheet 1.

S. E. HITT.
ELECTRICAL MEASURING OR INDICATING INSTRUMENT.

No. 514,075. Patented Feb. 6, 1894.

Witnesses
J. Jessen
F. S. Lyon

Inventor
Samuel E. Hitt.
By Paul & Hawley attys (No Model.) 3 Sheets—Sheet 2.

S. E. HITT.
ELECTRICAL MEASURING OR INDICATING INSTRUMENT.

No. 514,075. Patented Feb. 6, 1894.

Witnesses.

Inventor.
Samuel E. Hitt.
By Paul & Hawley attys

UNITED STATES PATENT OFFICE.

SAMUEL E. HITT, OF ROCKFORD, ILLINOIS.

ELECTRICAL MEASURING OR INDICATING INSTRUMENT.

SPECIFICATION forming part of Letters Patent No. 514,075, dated February 6, 1894.

Application filed April 7, 1893. Serial No. 469,399. (No model.)

*To all whom it may concern:*

Be it known that I, SAMUEL E. HITT, of the city of Rockford, county of Winnebago, State of Illinois, have invented a certain new and useful Improvement in Electrical Measuring or Indicating Instruments, of which the following is a specification.

My invention relates to improvements in potential and current indicating instruments, being equally adapted for either of said classes of devices.

The object of my invention is to shield or protect the electro-dynamometer or magnetic device from the influence of its exterior magnetism, whereby a greater degree of sensitiveness and a far greater degree of accuracy may be obtained.

My invention consists generally in a globular or spherical shield within which the operating and indicating parts of the instrument are inclosed, said sphere being made of a magnetic material, preferably iron. All points within the hollow iron sphere are at zero magnetically and the result of the use of the sphere is the diversion of all exterior lines of force emanating from adjacent magnetic or electro-magnetic objects, whereby the instrument proper is completely isolated, and its accuracy, so far as influenced by external forces, is assured.

My invention consists further in various details of construction and in combinations all as hereinafter described and more particularly pointed out in the claims, and will be more readily understood by reference to the accompanying drawings forming part of this specification, in which—

Figure 1:
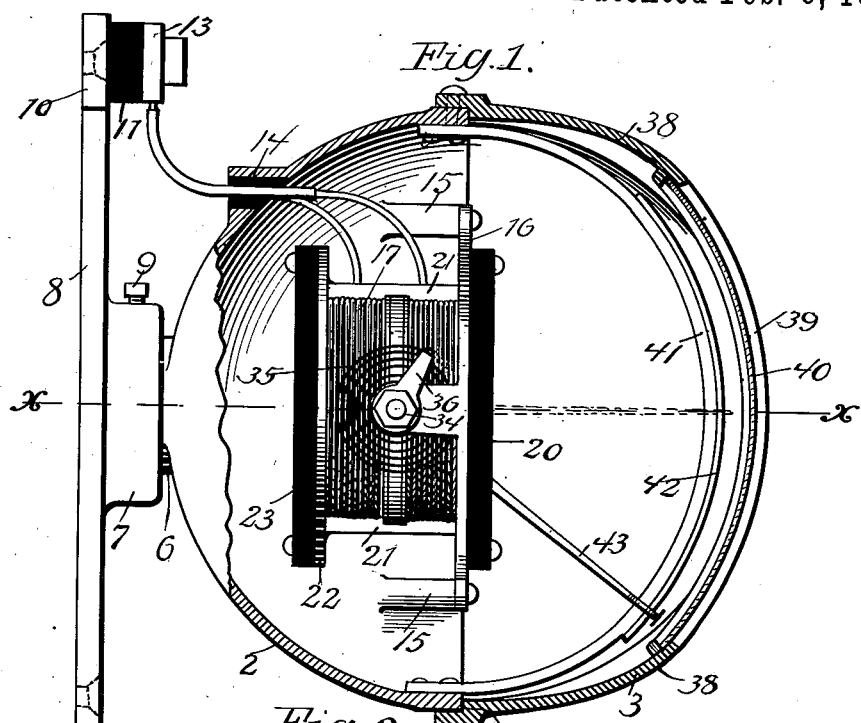
Figure 2:
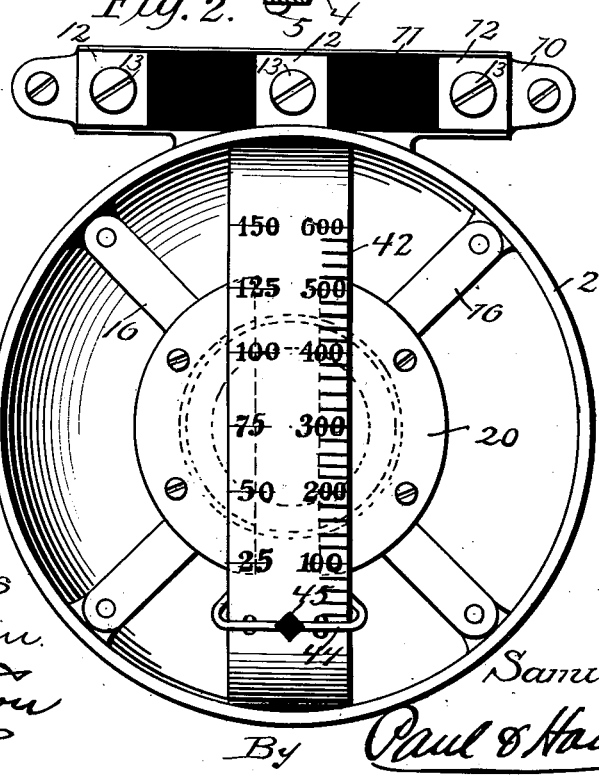
Figure 3:
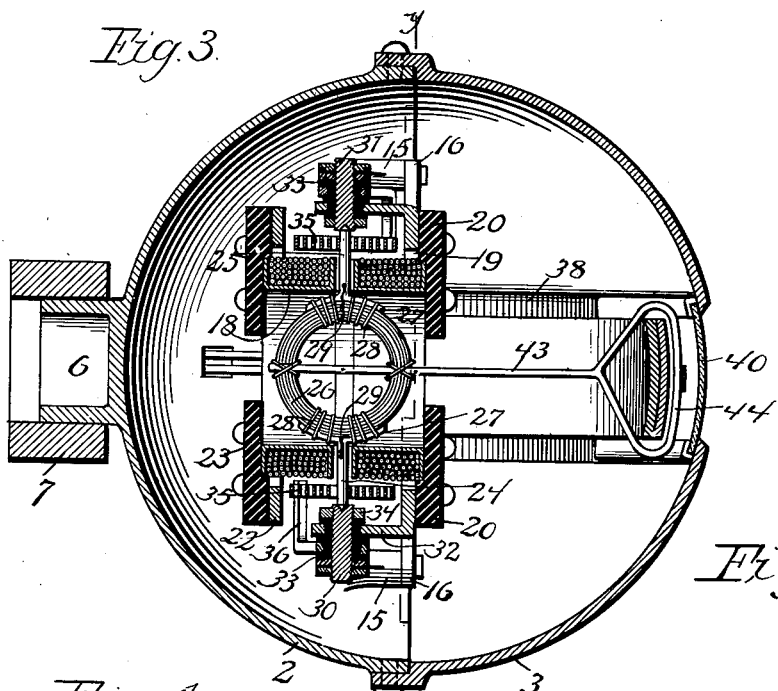
Figure 5:
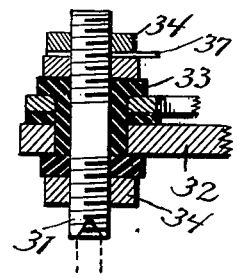
Figure 4:
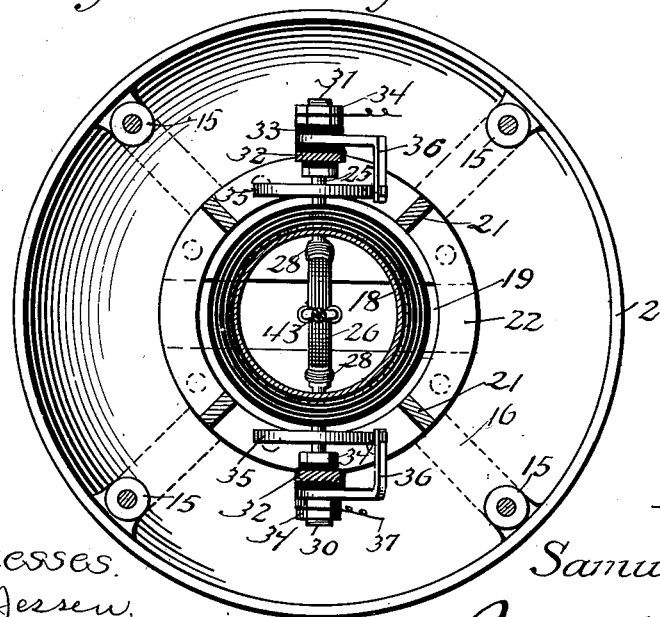

Figure 1 shows an instrument embodying my invention, a spherical case being shown in vertical longitudinal section. Fig. 2 is a front view of my device with the forward half of the sphere removed to show the scale part and the manner of supporting the dynamometer within the case. Fig. 3 is a horizontal section on the line x—x of Fig. 1, the pointer being shown in the position of the dotted lines therein. Fig. 4 is a vertical section on the line y—y of Fig. 3. Fig. 5 is a sectional detail showing the construction and manner of securing one of the jewels, and Fig. 6 is a diagrammatic view showing the circuits and the circuit connections of my device when the same is put into use.

In the drawings I have shown a hollow iron sphere, inclosing the instrument proper and composed of two halves or parts 2 and 3, the latter provided with an annular groove 4 in its inner edge to receive the edge of the former, the same being secured together by any desired means, as by short screws 5. The rear half of the sphere is provided with a central boss 6, which extends into a socket 7, provided upon the wall plate 8, the sphere secured preferably by a set screw 9, and the plate is secured upon the wall in any convenient manner. The plate is provided with a T-head 10, upon which is the long block 11 of insulating material and on this block I provide the three binding posts 12 in which the lead wires from both directions are secured by the screws 13. The instrument proper may be included in either a two-wire or three-wire circuit, as desired and is hereinafter so described. The leading in wires enter the sphere through the small opening 14 arranged therein and from the first two binding posts upon the T-head. The lugs 15 project inwardly from the walls of the rear part of the case and from these lugs I secure the spider or frame 16 of the indicating instrument. The field windings 17 are arranged within the non-magnetic sleeve 18, of less diameter than the opening 19 within the spider, and the sleeve is supported upon the hard rubber segments 20 fastened to the spider. The spider is provided preferably with the longitudinal cross bars 21 upon the ends of which the ring 22 is cast, all parts being integral and preferably reinforced by other hard rubber or fiber segments 23 all together forming a rigid frame for supporting the field coils of the instrument. The field windings are preferably separated into two bobbins and the space between them may be filled if desired, openings being left however, for the two stud shafts 24 and 25 belonging to the swinging coil 26. The coil is made of insulated wire, and each stud shaft is provided with a yoke 27 insulated from the coil, except as hereinafter described, and bound thereon by the bands 28, which hold the coils and the studs in perfect alignment. As shown by the connections 29, in Fig. 3 the opposite ends of the swinging coil are connected with the opposite studs 24 and 25 which therefore form the terminals of the armature coil. The stud shafts are provided with sharp conical ends, which are journaled in the cone recesses provided in the ends of the journal studs 30 and 31. These jewels are supported in the standards or lugs 32, projecting from the spider, and the journal studs are insulated therefrom by insulating buttons 33 shown most clearly in Fig. 5. Each journal stud is made adjustable by means of locking nuts 34 arranged on the threaded ends thereof and adapted to set against the ends of the hard insulation. The balancing springs 35 are oppositely arranged and have their inner ends secured upon their respective stud shafts, while their outer ends are fastened upon insulated arms or lugs 36, preferably arranged upon the journal studs as shown, but thoroughly insulated from the frame of the instrument, and preferably from the studs or screws. The leading in wires are connected with the opposite jewels, as shown in Fig. 5, where the end of the wire 37 is shown secured between the two end locking nuts upon the journal stud. The journal studs thus form the electrical connections with the swinging coil, the current being transmitted through the stud shafts 24 and 25.

It will be noticed that the pivotal center of the instrument lies considerably back of the center of the sphere, the object being to obtain a long sweep for the pointer and consequent distinct graduations upon the reading card. The end of the pointer swings in an arc therefor, which is not coincident with the circumference of the sphere, and I therefore provide the swell or offset 38 upon the outside thereof, within which I arrange the long slot 39, closed by the glass crystal or pane 40, secured upon the inside of the sphere. By cutting this slot in the outside of the sphere, I impair the shield, and to obviate the difficulty so presented I "magnetically" fill the opening by arranging the wide iron strap 41 within the sphere and before the opening, making the same concentric with the off-set curve, and securing its ends upon the inner part 2, as shown in Fig. 1, and making a good magnetic connection therewith. By this means I complete the magnetic circuit and the cross section of the shield or globe taken as a whole, and supply a practically uninterrupted path for the magnetic circuit. In addition, I secure a support for the indicator card 42 which is fastened upon the face of the strap 41. The strap and the indicator card are of sufficient width to permit a preferred use of two columns of figures and graduations upon opposite edges of the card, the columns and figures being adapted for use with either of two circuits, one of high and the other of low potential. The zero points of the two scales are arranged opposite one another, and the pointer 43 projecting from the swinging coil has an end 44 extending clear across the card and bears the center black spot or diamond 45, which can be plainly seen through the glass and moves between the two columns of figures.

Figure 6:
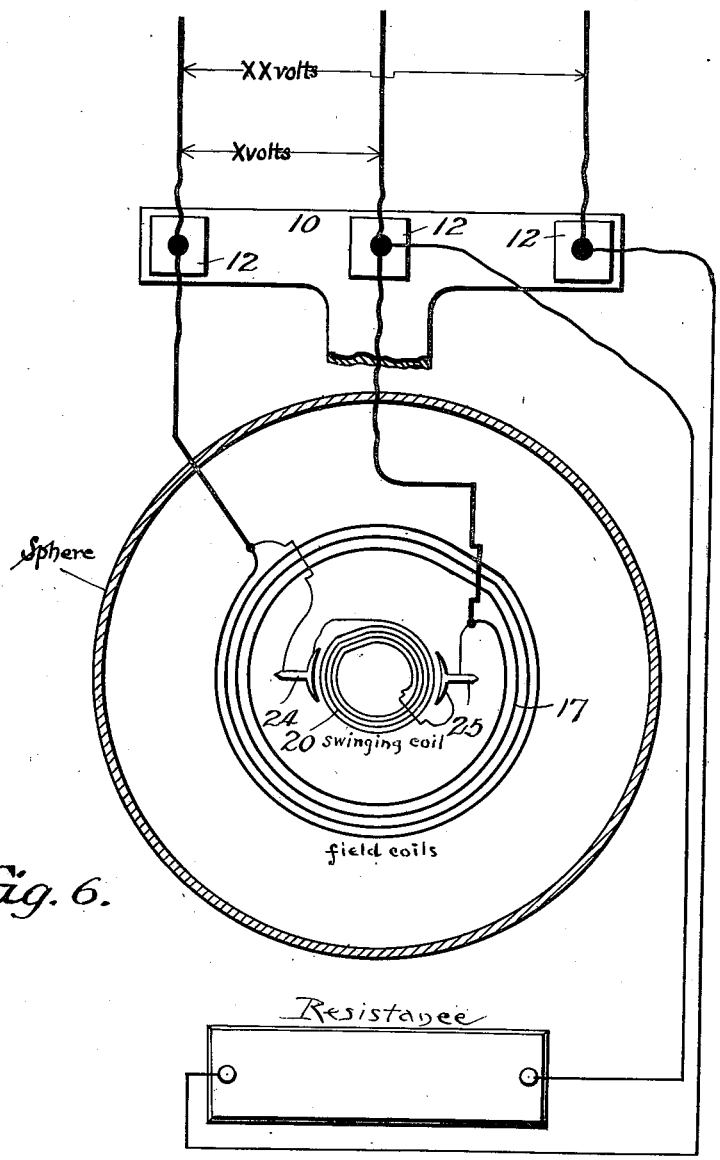

In Fig. 6 I have illustrated the circuit connections of my instrument and also the line connections therewith. As shown, the field coils 17 and the swinging coil 20 are preferably connected in multiple arc between the terminals of the leading in wires, which wires extend from the left hand and the middle binding posts upon the head 10 and are insulated therefrom as before described. Thus connected the instrument is ready for use upon a low potential circuit of which opposite wires or mains are connected with the said binding posts, the current passing directly through the windings of the instrument. In case, however, the instrument is to be used upon a high potential circuit the second wire is connected with the right hand binding post and a resistance inserted between the same and the middle post or, in other words, one side of the instrument. This would be the case where the instrument was included between the outside wires of a three-wire circuit, while in case it is used between the neutral wire and one of the outside wires the resistance would be cut out.

It is obvious that I may arrange the slot and the reading or scale card horizontally in the sphere, and that my magnetic shield may be employed with electrical instruments of various classes and constructions adapted for different uses. In addition to the advantages pointed out, my instrument possesses the further advantage of being practically air-tight and dust proof. Further, the sphere is thoroughly durable and capable of protecting the sensitive parts of the instrument from jars or blows, and a further and final advantage lies in the fact that all parts of the instrument proper are attached to the rear part of the sphere and are readily accessible upon simply removing the front of the sphere containing the glass.

Having thus described my invention, I claim as new and desire to secure by Letters Patent—

1. An electrical measuring or indicating instrument arranged in connection with a spherical magnetic shield entirely surrounding the same and adapted to protect the instrument from exterior magnetic influences.

2. An electrical instrument, provided with a spherical magnetic shield, the pointer of the instrument, the sphere being provided with a slot, and, the completing strap of magnetic material arranged before said slot, substantially as described and for the purpose specified.

3. The combination, in an electrical instrument, of the hollow iron sphere composed of separable parts, the instrument proper secured upon one of said parts, the other part of the sphere being provided with a slot, a transparent cover for said slot, a reading card arranged before said slot, and the pointer of the instrument adapted to operate over said card, substantially as described.

4. The combination, with the hollow iron sphere composed of separable parts, means for supporting the same, the instrument proper secured within one of said parts of the sphere, the other part provided with a slot, the iron completing strap 41, the reading card secured upon said strap before said slot, and said strap having its ends secured upon the part of the sphere which supports the instrument proper, and the pointer adapted to operate over said scale card before said slot, substantially as described.

5. The combination, with the hollow iron sphere, composed of the forward and rear separable parts, with means for securing said parts together and for magnetically connecting the same, the rear part of the sphere provided with means for its support, the instrument proper set within said rear part and having its pivotal center back of the center of the sphere, the pointer of the instrument, the forward part of the sphere provided with the off-set portion having a long slot, a transparent cover for said slot, and a reading scale or card, substantially as described.

6. The combination, with the hollow iron sphere, composed of the forward and rear separable parts, with means for securing said parts together and for magnetically connecting the same, the rear part of the sphere provided with means for its support, the instrument proper set within said rear part and having its pivotal center back of the center of the sphere, the pointer of the instrument, the iron completing strap 41 having its ends secured upon the rear part of the sphere and being of substantially equal width with said slot, and a scale card arranged upon said strap and before said slot, substantially as described.

7. The combination, in an electrical instrument, of a magnetic shield consisting of a hollow iron sphere, a reading card or scale arranged before the same, an iron completing strap having its ends secured upon and magnetically connected with the sphere, the electrical instrument proper consisting of field coils, a swinging coil bearing a pointer, the stud shafts of said swinging coil, the journal studs 30 and 31 wherein said stud shafts are journaled, the standards wherein said journal studs are adjustably supported and also insulated, and said journal studs and their respective stud shafts forming the terminals for said swinging coil, substantially as described.

8. The combination, in an electrical instrument, of field coils with supports therefor, the swinging coil, the pointer to move therewith, the stud shafts 24 and 25 having yokes secured upon opposite sides of said coil, the journal studs 30 and 31 wherein said stud shafts are respectively journaled, the standards for supporting said journal studs and wherein the same are insulated, the adjusting and locking nuts provided upon said journal studs and also insulated from said standards, the balancing springs having their inner ends secured upon said stud shafts, and means for adjustably securing the outer ends of said balancing springs, substantially as described.

9. The combination, in an electrical instrument, of the hollow iron sphere composed of the parts 2 and 3, means for securing said parts together, the instrument proper, the spider thereof, the arms of said spider being secured upon the part 2 of the sphere, the magnetically closed slot in the forward part of the sphere, a reading guide or scale arranged therein and over which the pointer of the instrument is adapted to move, the rear part 2 provided with the boss 6, the socket plate to receive the same, said plate provided with the T-head having an insulating block, and the binding posts arranged upon said block, substantially as and for the purpose specified.

In testimony whereof I have hereunto set my hand this 28th day of March, 1893.

SAMUEL E. HITT.

In presence of—
  WM. G. ROSS,
  R. FLEMING.